UNITED STATES PATENT OFFICE.

LEWIS CAMERON, OF ELORA, ONTARIO, CANADA.

BABBITT-RETAINING COMPOSITION.

1,215,109.      Specification of Letters Patent.      Patented Feb. 6, 1917.

No Drawing.      Application filed September 21, 1916. Serial No. 121,495.

*To all whom it may concern:*

Be it known that I, LEWIS CAMERON, of the town of Elora, in the county of Wellington, in the Province of Ontario, Canada, have invented certain new and useful Improvements in Babbitt-Retaining Compositions, of which the following is the specification.

My invention relates to improvements in a babbitt retaining composition and the object of the invention is to devise such a composition which will be immediately ready for use whenever desired without any preliminary mixing or preparation of any kind and it consists of the following ingredients:

Each pound of my composition is composed of equal parts asbestos and fire clay, one ounce of pencil graphite, four ounces of sand and one-fourth pint cylinder oil.

The above ingredients of which the asbestos, clay and oil are indispensable are to be mixed when subject to heat at a temperature between 125 and 135° F.

My composition when prepared as above will not crack or burn or be detrimentally affected in any way by the heat of the babbitt or brass and will dispense with the use of leather, paste-board or other holding means such as are commonly employed when using putty or other material commonly in use for babbitt retainers.

My composition also needs no mixing and, therefore, produces an economy in time as it is instantly ready for use whenever desired.

The graphite added to the mixture of asbestos, clay and oil prevents it from sticking so that the mixture will come away from the work clean. It also will not stick unduly to the hands of the worker. The sand is added to the mixture to shorten it or to make the mixture more readily broken up into small pieces. Without the sand, the mixture would be very tough. It has the further advantage of preventing the oil from too quickly drying out of the mixture and consequent hardening.

The composition above described may be used for forming molds for casting but is principally used for walling up the ends of journal bearings while the babbitt is being poured thereinto.

What I claim as my invention is.

1. A babbitt retainer consisting of fiber asbestos and fire clay in equal parts and one-quarter pint of oil to each pound of the aforesaid ingredients.

2. A babbitt retainer consisting of fiber asbestos and fire clay in equal parts, pencil graphite one ounce to each pound, sand four ounces and cylinder oil one-quarter pint.

3. A babbitt retainer consisting of fiber asbestos and fire clay in equal parts, pencil graphite one ounce to each pound and cylinder oil one-quarter pint.

LEWIS CAMERON.

Witnesses:
 M. EGAN,
 G. SUGLEY.

Copies of this patent may be obtained for five cents each, by addressing the "Commissioner of Patents, Washington, D. C."